United States Patent
Hoskins

(10) Patent No.: US 9,534,695 B2
(45) Date of Patent: Jan. 3, 2017

(54) MULTI-POSITION VALVES

(71) Applicant: Matt Hoskins, Bend, OR (US)

(72) Inventor: Matt Hoskins, Bend, OR (US)

(73) Assignee: TSI Manufacturing, LLC, Bend, OR (US)

( * ) Notice: Subject to any disclaimer, the term of this patent is extended or adjusted under 35 U.S.C. 154(b) by 0 days.

(21) Appl. No.: 14/598,021

(22) Filed: Jan. 15, 2015

(65) Prior Publication Data

US 2015/0196148 A1 Jul. 16, 2015

Related U.S. Application Data

(60) Provisional application No. 61/927,865, filed on Jan. 15, 2014.

(51) Int. Cl.
*A47G 19/22* (2006.01)
*F16K 5/04* (2006.01)
*A45F 3/16* (2006.01)

(52) U.S. Cl.
CPC ........... *F16K 5/0414* (2013.01); *F16K 5/0421* (2013.01); *A45F 3/16* (2013.01)

(58) Field of Classification Search
CPC ......... F16K 5/0414; F16K 5/0421; A45F 3/16
USPC ............ 137/613, 637.4; 222/175; 224/148.1, 224/148.2
See application file for complete search history.

(56) References Cited

U.S. PATENT DOCUMENTS

| 2,755,974 | A | 7/1956 | Godfrey |
| 2,797,837 | A | 7/1957 | Roberts |
| 3,128,000 | A | 4/1964 | Haberle |
| 4,531,655 | A | 7/1985 | Putnam |
| 4,775,081 | A | 10/1988 | Morane |
| 4,830,227 | A | 5/1989 | Ball et al. |
| 5,297,686 | A | 3/1994 | Takeuchi |
| 5,505,345 | A | 4/1996 | Zeid |
| 6,039,305 | A | 3/2000 | Hoskins et al. |
| 6,199,729 | B1 * | 3/2001 | Drzymkowski .......... A45F 3/20 138/120 |
| 6,276,560 | B1 | 8/2001 | Belcastro |
| 6,994,269 | B2 * | 2/2006 | Lien ...................... F16K 5/0414 220/703 |
| 7,097,078 | B2 | 8/2006 | Sanchez |
| 7,341,097 | B2 | 3/2008 | Darby |
| 7,464,837 | B2 | 12/2008 | Hoskins |
| 7,533,783 | B2 | 5/2009 | Choi et al. |
| 7,621,294 | B2 * | 11/2009 | Wang ........................ A45F 3/20 137/613 |

(Continued)

FOREIGN PATENT DOCUMENTS

| CH | 276694 | 11/1951 |
| DE | 1141555 | 12/1962 |

(Continued)

*Primary Examiner* — Fenn Mathew
*Assistant Examiner* — Robert Stodola
(74) *Attorney, Agent, or Firm* — Klarquist Sparkman, LLP

(57) ABSTRACT

Disclosed herein are exemplary embodiments of multi-position valves, such as for drinking from a portable fluid container. Disclosed valves allow for manual actuation of the valve between three or more positions, including a closed position, a selectively open position where a user can obtain fluid through the valve by selectively actuating a bite valve, and a fully open position where the bite valve is disengaged to permit free flow of fluid through the valve.

14 Claims, 15 Drawing Sheets

(56) References Cited

U.S. PATENT DOCUMENTS

| | | | |
|---|---|---|---|
| 7,648,038 B2 | 1/2010 | Brozell | |
| 7,806,300 B1 * | 10/2010 | Noell | A45F 3/20 |
| | | | 222/175 |
| 7,931,175 B2 | 4/2011 | Hjort | |
| 8,152,138 B2 | 4/2012 | Skillern | |
| 8,336,724 B2 | 12/2012 | Yamashita et al. | |
| 8,376,173 B2 | 2/2013 | Britto et al. | |
| 8,602,238 B2 | 12/2013 | El-Saden et al. | |
| 8,646,658 B2 | 2/2014 | Bae | |
| 9,079,205 B2 | 7/2015 | Hoskins | |
| 2010/0307715 A1 * | 12/2010 | Emenheiser | A45F 3/16 |
| | | | 165/47 |
| 2012/0273074 A1 | 11/2012 | Yamada et al. | |
| 2013/0175302 A1 | 7/2013 | Sariu | |
| 2015/0122358 A1 | 5/2015 | Hoskins | |

FOREIGN PATENT DOCUMENTS

| | | |
|---|---|---|
| GB | 387446 | 2/1933 |
| JP | 3524649 | 3/1997 |

* cited by examiner

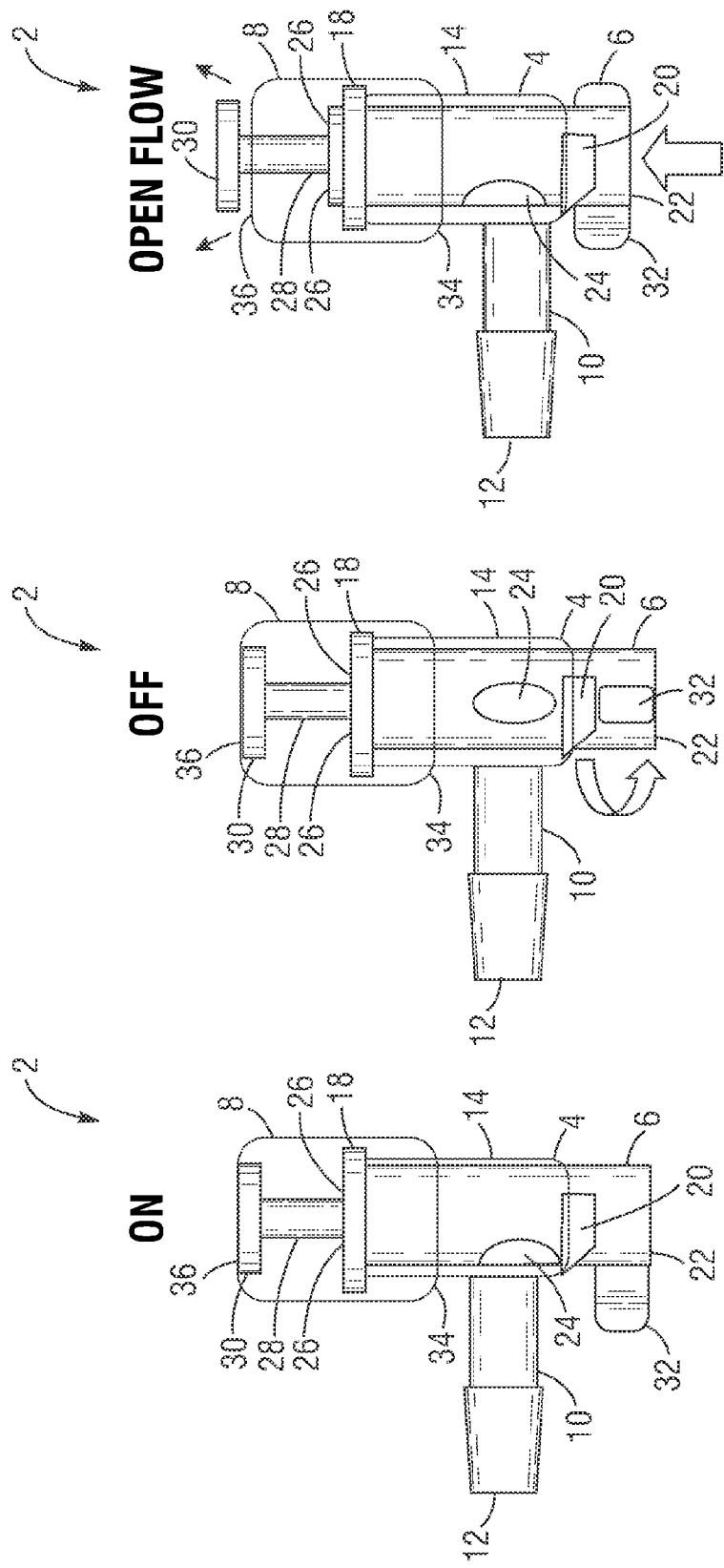

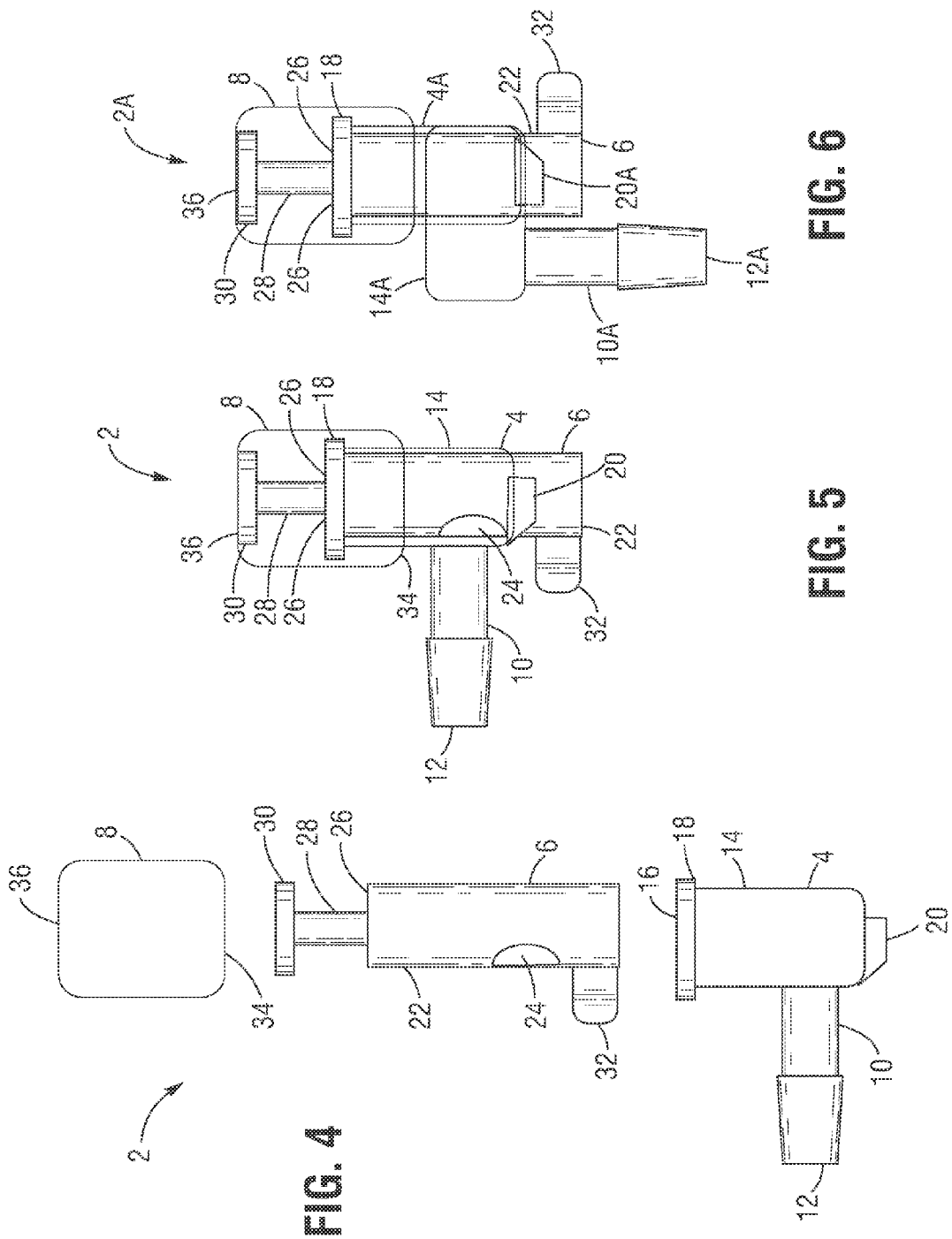

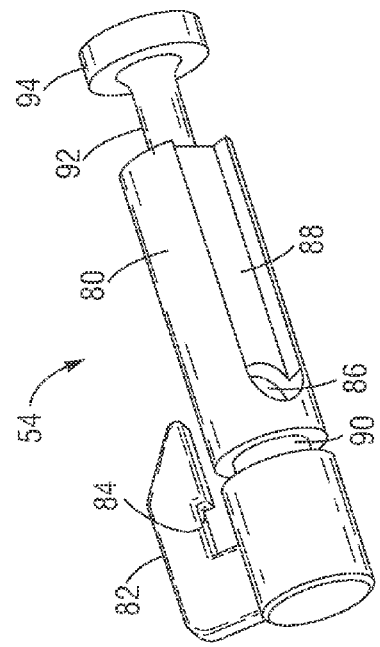
FIG. 20
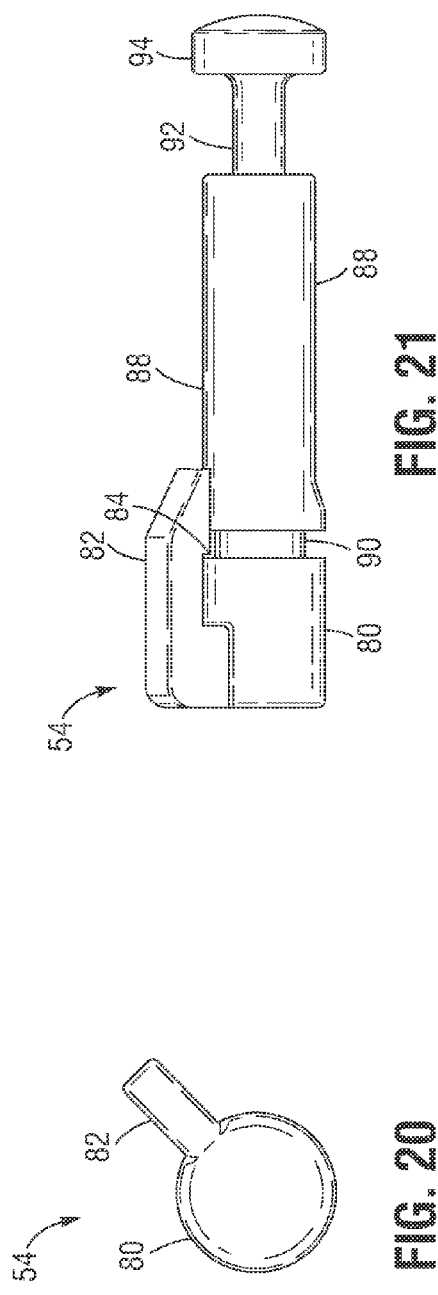
FIG. 21
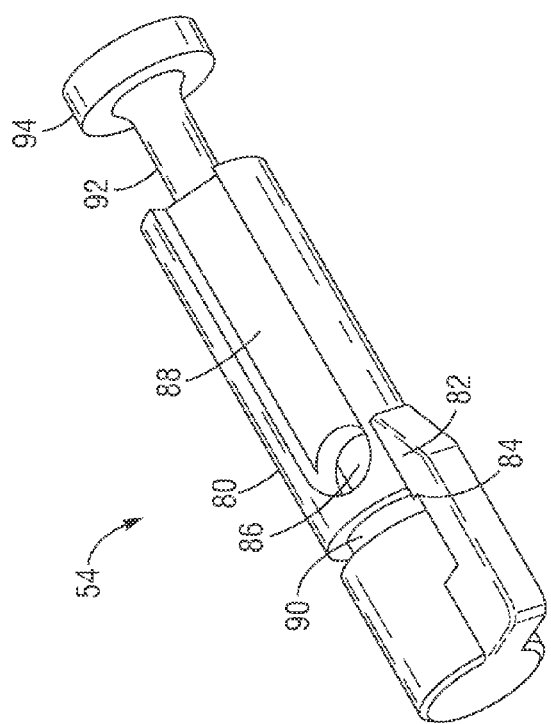
FIG. 22
FIG. 23

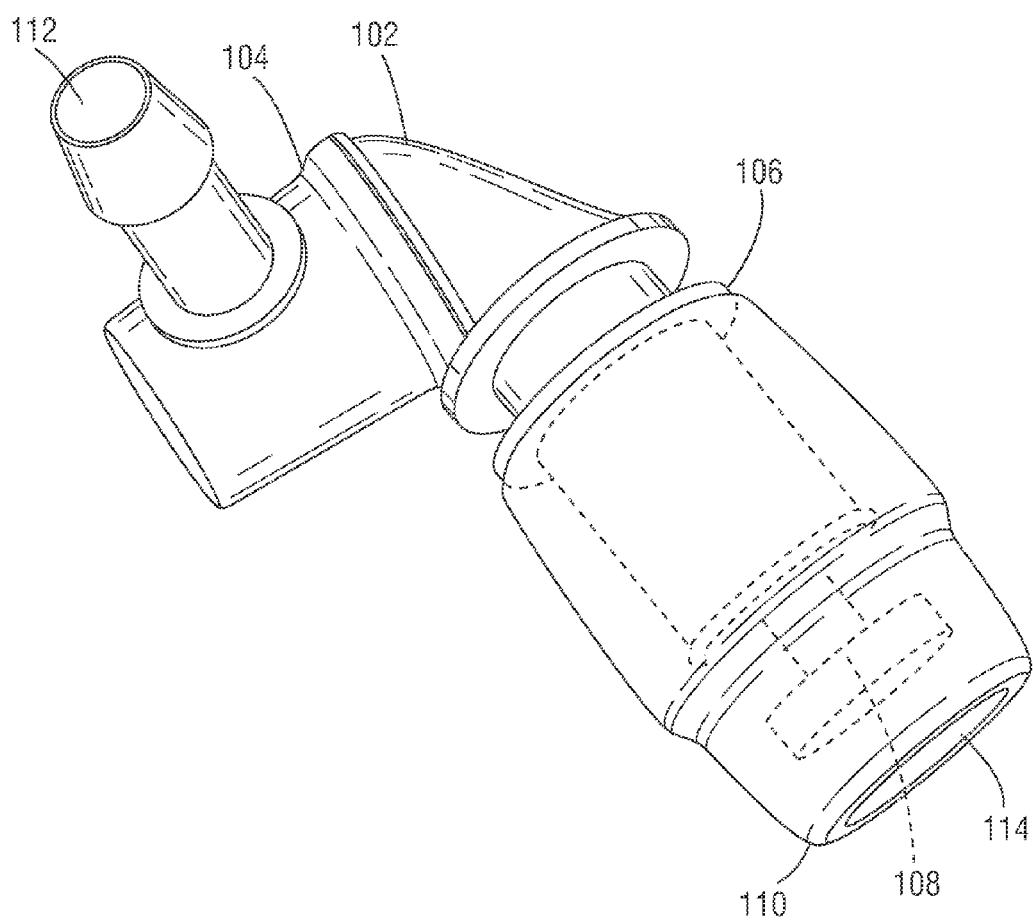

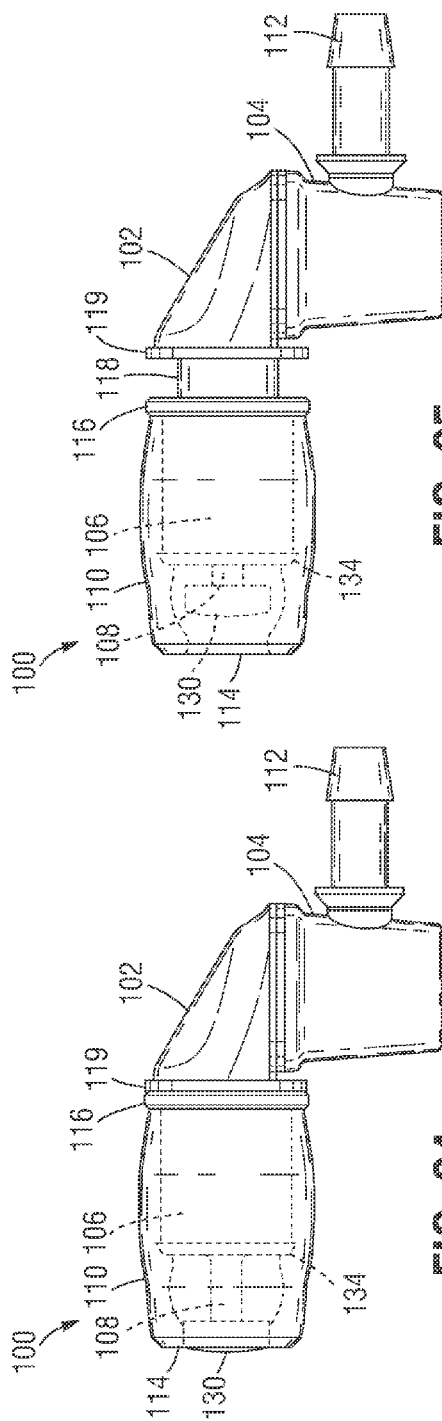
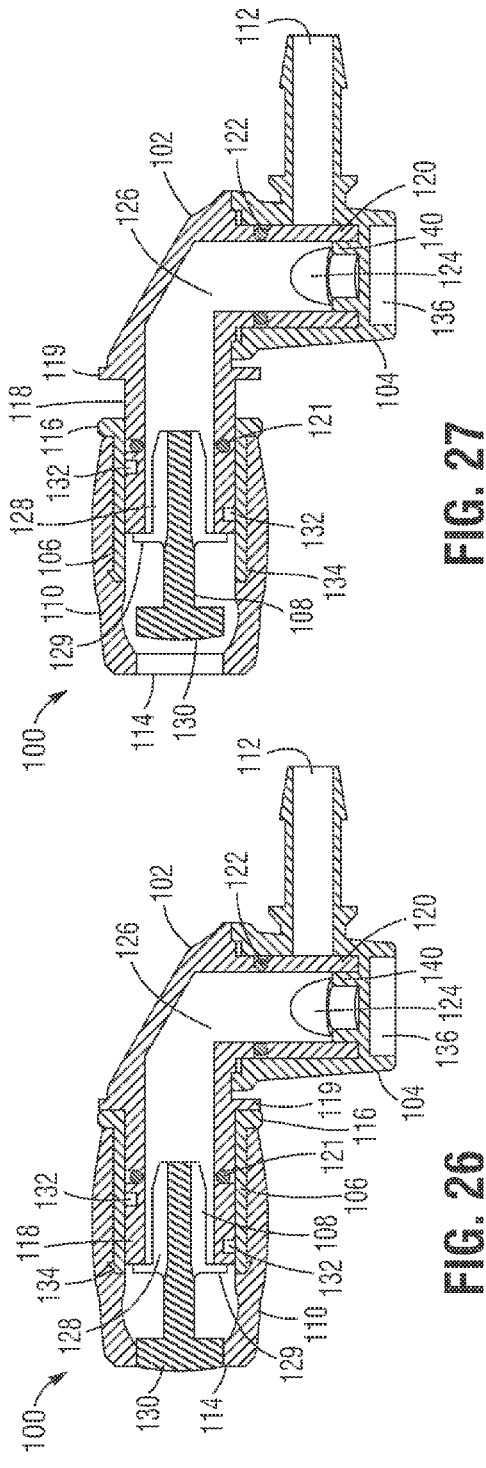

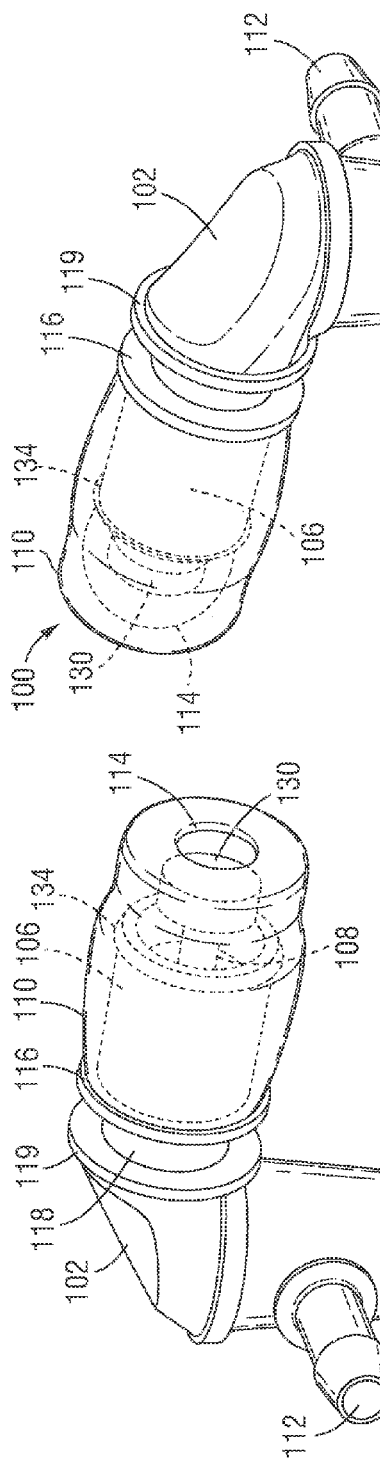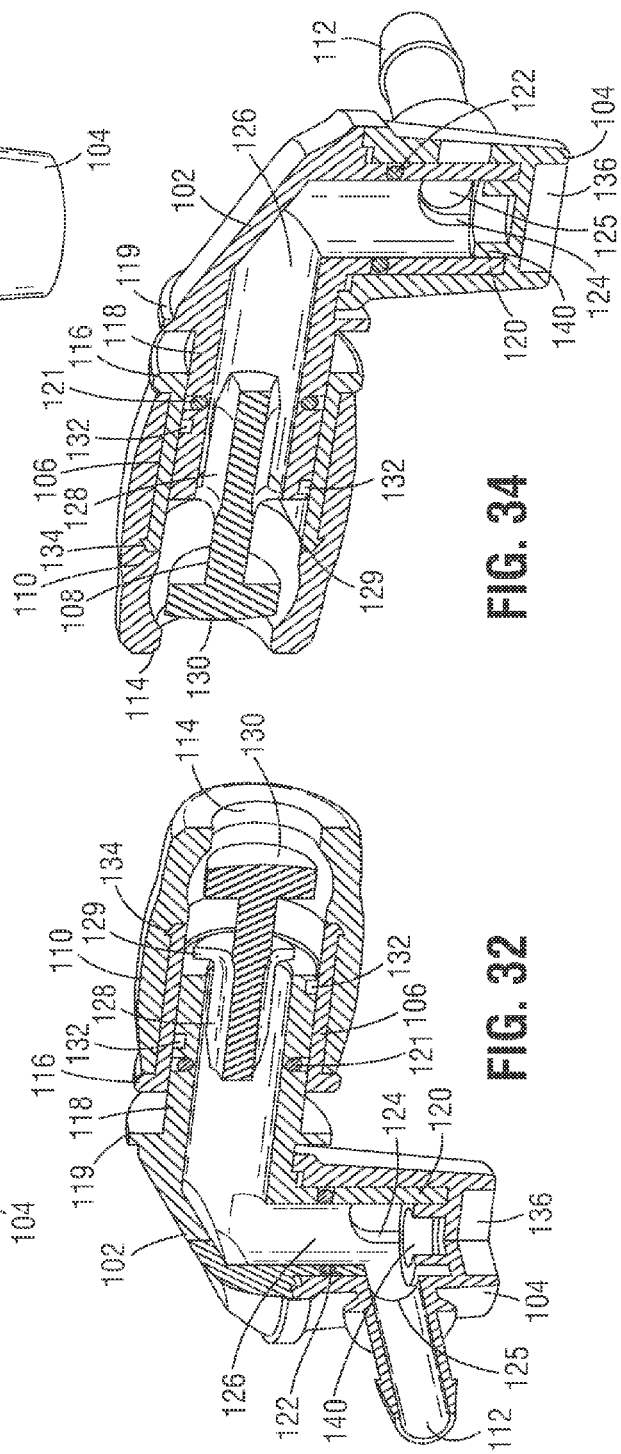
FIG. 31
FIG. 32
FIG. 33
FIG. 34

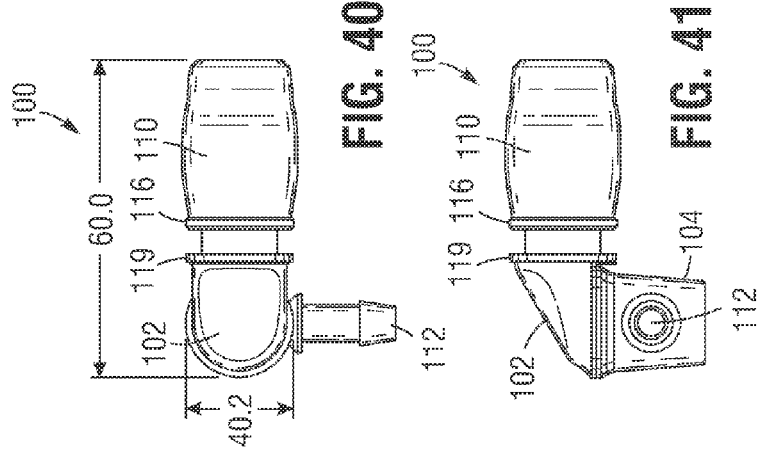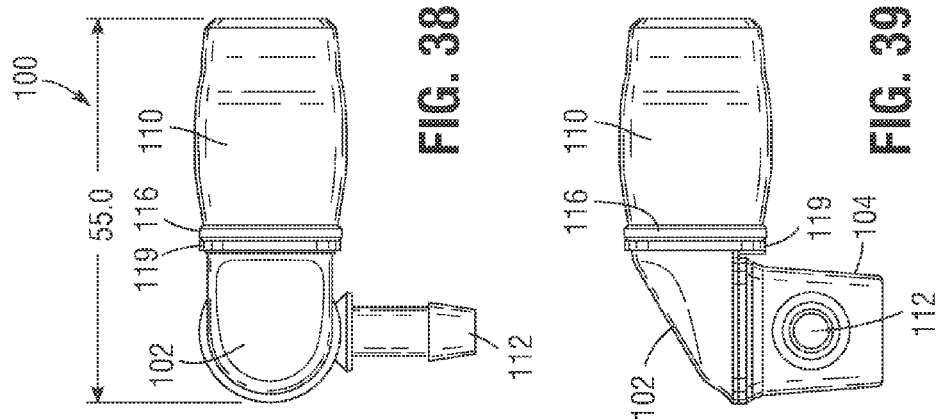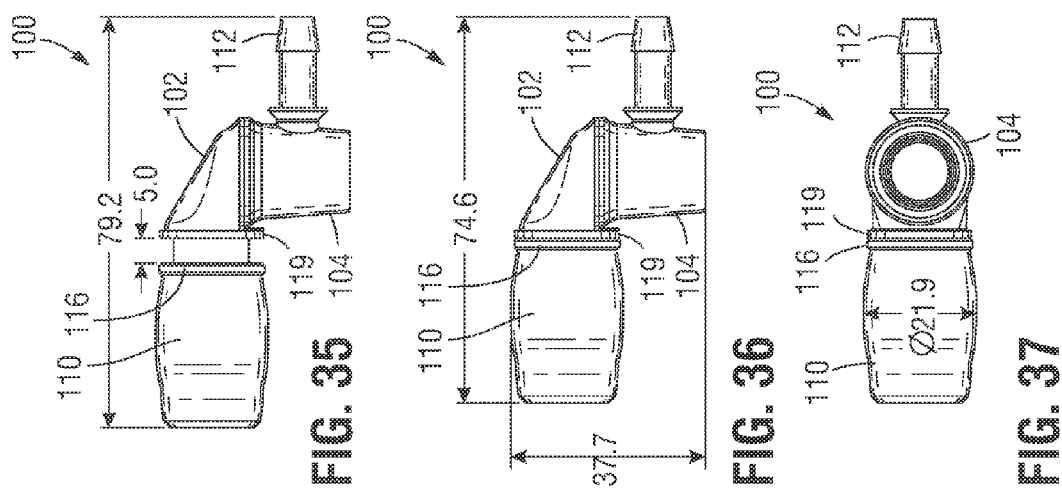

MULTI-POSITION VALVES

CROSS REFERENCE TO RELATED APPLICATION

This application claims the benefit of U.S. Provisional Application No. 61/927,865, filed on Jan. 15, 2014, which is incorporated herein by reference in its entirety.

FIELD

This disclosure is related to valves for dispensing fluid from drinking containers.

BACKGROUND

Sufficient hydration is important for replacing bodily fluids during periods of aerobic activity, such as during cycling. A person engaged in aerobic activity could stop the aerobic activity and take a drink, such as at aid stations. However, this disrupts the aerobic activity and is not well suited for events like competitive cycling races.

It is desirable to make replenishment fluid available without the need to slow or stop aerobic activity. Water bottles carried by persons engaged in aerobic activity represent an attempt to overcome the problems associated with aid stations. However, water bottles can be awkwardly shaped and at least one hand is required for as long as one is drinking from the water bottle. Therefore, the use of water bottles can present safety hazards to cyclists and other active individuals.

In an attempt to overcome the deficiencies of water bottles, hydration systems have been developed that include a flexible reservoir for holding fluid, a flexible tube for conveying the fluid from the reservoir to the person engaged in aerobic activity, and a valve, such as a mouth operated "bite valve," attached to the end of the tube. In the case of a bite valve, when it is desired to replenish fluids, the person engaged in aerobic activity places the outlet of the valve in his or her mouth and bites down on a flexible sheath. The sheath deforms and is taken out of sealing engagement with an internal stem, and fluid from the reservoir flows into the person's mouth. However, bite valves can be subject to wear as the flexible portion (typically made of polymeric material) tends to weaken over extended use. If weakened, the valves may experience difficulty in maintaining a closed position when the biting force is removed, and thus may leak. Furthermore, a typical bite valve cannot be adjusted to an "always open" position to allow for free flow through the valve.

SUMMARY

Disclosed herein are exemplary embodiments of multi-position valves, such as for drinking from a portable fluid container. Disclosed valves allow for manual actuation of the valve between three or more positions, including a closed position, a selectively open position where a user can obtain fluid through the valve by selectively actuating a bite valve, and a fully open or always open position where the bite valve is disengaged to permit free flow of fluid through the valve.

In some embodiments, the valve comprises a main housing component and an inlet housing component rotatably coupled to the main housing component, such that the inlet housing component can be positioned at a first rotational position relative to the main housing component to allow fluid flow from a fluid inlet through the valve, and the inlet housing component can be positioned to a second rotational position relative to the main housing component to block fluid flow through the valve. The fluid inlet of the inlet housing component can be configured to be coupled to a flexible hose that is coupled to a portable fluid container, such that fluid can flow from the fluid container, through the flexible hose, and through the valve for drinking by a user.

In some embodiments, the bite valve comprises a base coupled to an outlet end of a main housing component of the valve, a sheath mounted around the base, and a stem mounted in a fluid outlet of the main housing component. The stem and the sheath form a seal that blocks fluid flow through the bite valve when the bite valve is not actuated, and the sheath can be resiliently deformed to open the seal to allow fluid flow through the bite valve. In some embodiments, the base can be mounted to the main housing component such that rotation of the base relative to the main housing component causes axial motion of the base and sheath relative to the main housing component and the stem, wherein rotation of the base in one direction moves the sheath into a selective actuation position where the sheath seals against the stem, and rotation of the base in a second direction opposite the first direction moves the sheath into a vented or bypass position wherein the sheath remains spaced apart from the stem and allows free fluid flow through the bite valve.

In some embodiments, the base is rotatable about a first axis relative to the main housing component, the inlet housing component is rotatable about a second axis relative to the main housing component, and the first axis is perpendicular to the second axis.

In some embodiments, the base moves along a helical path relative to the main housing component.

Some embodiments of a multi-position valve comprise a housing, a stem, and a resiliently flexible bite valve sheath. The housing comprises a fluid inlet and a fluid outlet, a fluid passageway extending between the fluid inlet and the fluid outlet, and a rear opening in communication with the fluid passageway. The stem extends through the rear opening of the housing, through a portion of the fluid passageway, and through the fluid outlet of the housing. The sheath is mounted around the fluid outlet of the housing and around a sealing head of the stem. The stem is rotatable about a stem rotation axis relative to the housing to adjust the valve between a closed position, where fluid flow through the fluid passageway is blocked, and an open position where fluid flow through the fluid passageway is permitted. When the stem is rotated to the open position, the stem is slidable along the stem rotation axis relative to the housing and the sheath to adjust the valve between a selectively open position, where the stem head seals against the sheath and a user can pinch the sheath to break the seal and allow fluid flow through the valve, and a fully open position where the sheath is does not seal against the stem head and fluid flow is allowed through the valve without pinching the sheath.

In some embodiments, the stem head is retracted axially into the sheath to adjust the valve to the fully open position, and in other embodiments the stem head is advanced axially out of the sheath to adjust the valve to the fully open position.

In some embodiments, the stem includes an arm that engages with an outside of the housing to limit axial motion of the stem relative to the housing.

In some embodiments, the valve has a right-angled configuration with its fluid inlet oriented perpendicular to its fluid outlet, while in other embodiments the fluid inlet is parallel with the fluid outlet.

The foregoing and other objects, features, and advantages of the disclosed technology will become more apparent from the following detailed description, which proceeds with reference to the accompanying figures.

BRIEF DESCRIPTION OF THE DRAWINGS

FIG. 1 is a side view of an exemplary multi-position valve in an open position with a bite valve portion engaged to allow for selective drinking.

FIG. 2 is a side view of the valve of FIG. 1 in a closed configuration, with the bite valve portion engaged.

FIG. 3 is a side view of the valve of FIG. 1 in an open configuration, with the bite valve portion dis-engaged to allow for free flow of fluid through the valve.

FIG. 4 is an exploded view of the valve of FIG. 1.

FIG. 5 is another side view of the valve of FIG. 1 in the open position with the bite valve portion engaged, showing a generally right angle between its inlet and its outlet.

FIG. 6 is a side view of an alternative embodiment of the multi-position valve of FIG. 5, wherein the inlet and the outlet are oriented generally parallel with each other.

FIG. 20 is a rear view of the adjustable stem of the valve of FIGS. 7-15.

FIG. 21 is a side view of the stem of FIG. 20.

FIGS. 22 and 23 are perspective view of the stem of FIG. 20.

FIG. 23A is a photograph showing an embodiment of the multi-position valve shown in FIGS. 24-34.

FIG. 24 is a side view of another multi-position valve in a closed position with a bite valve portion engaged.

FIG. 25 is a cross-sectional view of FIG. 24.

FIG. 26 is a side view of the valve of FIG. 24 in a closed position with the bite valve dis-engaged.

FIG. 27 is a cross-sectional view of FIG. 26.

FIG. 31 is a front perspective view of the valve of FIG. 24 in an open position with the bite valve dis-engaged to allow free flow of fluid through the valve.

FIG. 32 is a cross-sectional view of FIG. 31.

FIG. 33 is a rear perspective view of the valve in the configuration of FIG. 31.

FIG. 34 is a cross-sectional view of FIG. 33.

FIGS. 35-41 are orthogonal views of the valve of FIGS. 24-34 in various configurations showing exemplary dimensions.

DETAILED DESCRIPTION

Figure 7:
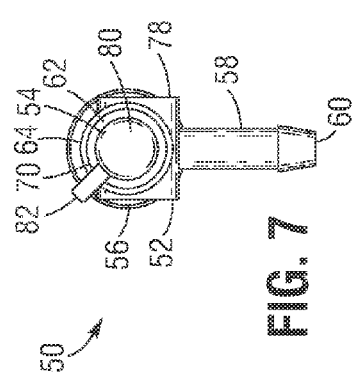
FIG. 7 is a rear view of another multi-position valve embodiment in a closed position with a bite valve portion engaged.

Disclosed herein are exemplary embodiments of multi-position valves, such as for drinking from a portable fluid container. Disclosed valves allow for manual actuation of the valve between three or more positions, including a closed position, a selectively open position where a user can obtain fluid through the valve by selectively actuating a bite valve, and a fully open position where the bite valve is disengaged to permit free flow of fluid through the valve.

FIGS. 1-5 show an exemplary multi-position valve 2 in various operative positions. The valve 2 comprises a housing 4 (shown in green), an adjustable valve stem 6 (shown in gray), and a flexible sheath 8 (shown semi-transparent), as shown in the exploded view of FIG. 4. The sheath 8 is mounted on an outlet end of the housing 4 and the stem 6 is mounted within the housing and sheath. To adjust the valve 2, the stem 6 can be manually moved to at least the three positions shown in FIGS. 1-3.

The housing 4 comprises an inlet conduit 10 with an inlet opening 12 that is fluidly coupled with a tubular portion 14. The inlet conduit 10 can be fluidly connected to a fluid source (e.g., a water bottle or bladder) such as via a flexible tube. The tubular portion 14 has a generally circular inner passageway in which the stem 6 is positioned. The housing 4 can further include an outer rim 18 or similar protrusion at one end of the body 14 to retain the sheath 8.

The stem 6 comprises a generally cylindrical body 22 that extends through the tubular portion 14 of the housing and includes a radial opening 24 coupled with one or more distal outlets by an inner passageway (not shown) extending through the body 22. When the stem 6 is rotated relative to the housing 4 such that the radial opening 24 is aligned with the inlet conduit 10 of the housing, as shown in FIGS. 1 and 3, fluid can flow from the inlet 12, through the inlet conduit 10, through the radial opening 24 of the stem, through the inner passageway in the body 22, through the outlets 26 of the stem, and into an open region within the sheath 8. This is referred to as the "open" or "on" position herein. However, when the stem 6 is rotated such that the radial opening 24 does not at least partially overlap with the inlet conduit 10, such as in FIG. 2, a solid side wall of the body 22 of the stem covers the inlet conduit 10 and prevents fluid flow through the valve 2. This is referred to as the "closed" or "off" position herein. To rotate the stem 6 between the open and closed positions, a handle or tab 32 can be located on the back end of the body 22, as shown in FIG. 1.

As shown in FIG. 1, the sheath 8 and the stem 6 form a bite valve downstream from the housing 4. The stem 6 includes a neck 28 extending from the body 22 adjacent to the stem fluid outlets 26 and a disk 30 at the end of the neck 28. In the configuration shown in FIGS. 1 and 2, an outlet end 36 of the sheath 8 forms a valve seat that contacts the perimeter of the disk 30 and forms a seal. The opposite end 34 of the sheath 8 is also sealed around the perimeter of the outer rim 18 of the housing 4 such that fluid does not readily exit the valve through the sheath 8 under passive conditions. However, the sheath 8 is elastically deformable and the outlet end 36 of the sheath can selectively be separated from the perimeter of the disk 30 to allow fluid flow, such as by biting down or pinching on the outside of the sheath around the neck 28 or by increasing the fluid pressure within the sheath. Thus, in the configuration of FIG. 1, the valve 2 is ready for a user to selectively access fluid when needed by biting on the sheath 8 to open the bite valve. More information regarding exemplary bite valve mechanics and components are described, for example, in U.S. Pat. No. 6,039,305 and U.S. patent application Ser. No. 14/533,990, filed on Nov. 5, 2014, both of which are hereby incorporated by reference in their entirety.

As shown in FIG. 3, the valve 2 can also be adjusted to an "open flow" or "vented" position by moving the stem 6 axially relative to the housing 4 in the direction of the blue arrow (toward the disk 30) such that the disk 30 moves axially out of the outlet end 36 of the sheath and leaves the bite valve in an always-open configuration. Fluid can thus freely flow through the inlet conduit 10, through the radial opening 24, through the passageway within the stem body 14, through the stem outlets 26, through the sheath 8, and out of the valve 2 between the sheath outlet 36 and the neck 28.

The stem 6 can be manually moved axially (i.e., up and down directions in FIG. 1) between the "on" position of FIG. 1 and the "open flow" position of FIG. 3 in any manner, such as by pushing or pulling on the ends of the stem. The tab 32 at the rear end of the stem body 22 can protrude radially beyond the rear of the tubular portion 14 of the housing 4 and can thus also serve to limit the forward axial position of the stem 6 relative to the housing 4 in the open flow position of FIG. 3. The interface between the stem and housing can similarly include a feature that limits the rearward axial position of the stem 6 in the on position of FIG. 1 such that the disk 30 seals properly in the outlet 36 of the sheath. The radial opening 24 can be sized and shaped such that it sufficiently overlaps the inlet conduit 10 in both the on position and the open flow position, while also allowing the valve to shift to the off position of FIG. 2.

When the stem 6 is rotated to the off position of FIG. 2, it can be undesirable for the stem to move axially relative to the housing 4 in order to maintain the bite valve portion sealed. To block the stem 6 from moving axially forward, a flange 20 can be included at the rear of the housing 4 that protrudes further rearwardly than the rest of the tubular portion 14. The flange 20 can be oriented at an angular position such that it is aligned in front of the tab 32 when the radial opening 24 is angularly mis-aligned with the inlet conduit 10 (as in FIG. 2) and such that the flange 20 is not in the way of the tab 32 when the radial opening 24 is angularly aligned with the inlet conduit. In some embodiments, the flange 20 can include a ramped edge to facilitate moving the tab 32 onto the flange 20, as shown in FIG. 2. The valve 2 can further include a positive locking mechanism to hold the stem in the off position.

FIGS. 5 and 6 compare the valve 2 with an alternative valve 2A that is functionally similar to the valve 2, but with an alternative housing 4A that includes an inlet conduit 10A that extends rearwardly and is parallel with the stem axis rather that at right angles as in FIG. 5. The tab 32 is positioned on the opposite side of the stem to accommodate the rearwardly extending inlet conduit 10A and the flange 20A is also reversed accordingly. Any intermediate inlet conduit angle can similarly be employed, as well as other geometric alternatives that maintain the same valve functionality as described herein.

Figure 8:
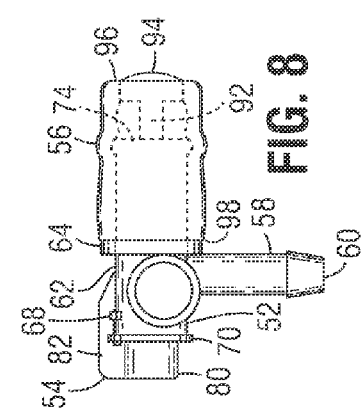
FIG. 8 is a side view of the valve of FIG. 7 in the closed position with the bite valve portion engaged.
Figure 9:
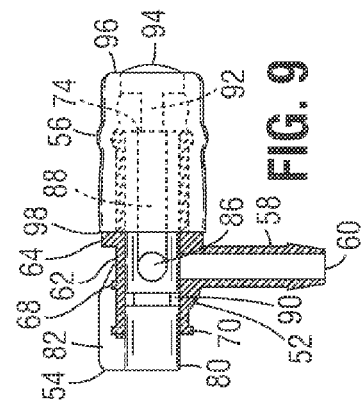
FIG. 9 is similar to FIG. 8, but with a portion of the valve housing shown in cross-section.
Figure 10:
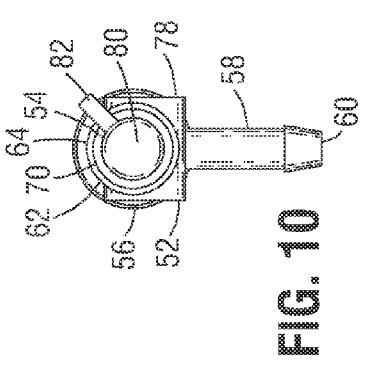
FIG. 10 is a rear view of the valve of FIG. 7 in an open position with a bite valve portion engaged.
Figure 11:
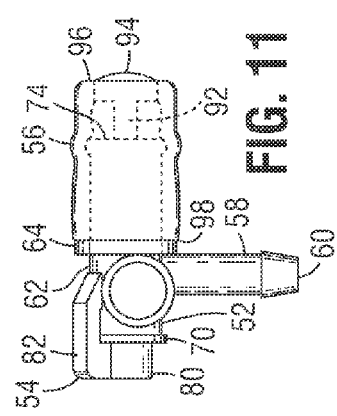
FIG. 11 is a side view of the valve of FIG. 10 in the open position with the bite valve portion engaged.
Figure 12:
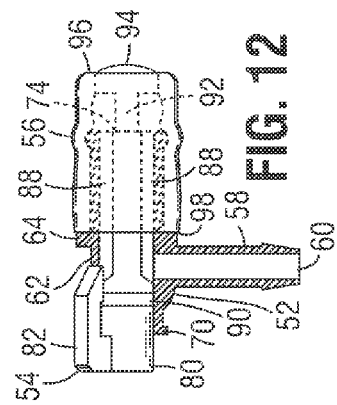
FIG. 12 is similar to FIG. 11, but with a portion of the valve housing shown in cross-section.
Figure 13:
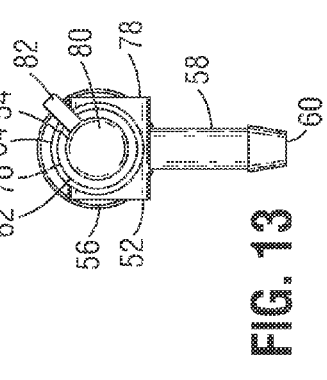
FIG. 13 is a rear view of the valve of FIG. 7 in an open position with a bite valve portion dis-engaged to allow for free flow of fluid through the valve.
Figure 14:
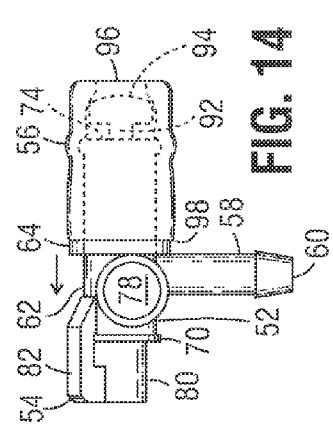
FIG. 14 is a side view of the valve of FIG. 13 in the open position with the bite valve portion dis-engaged to allow for free flow of fluid through the valve.
Figure 15:
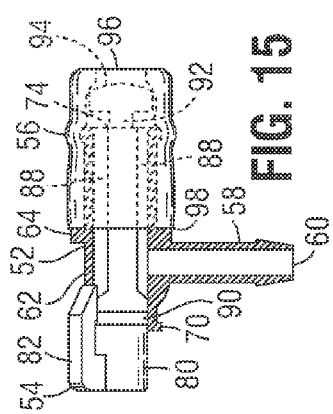
FIG. 15 is similar to FIG. 14, but with a portion of the valve housing shown in cross-section.
Figures 16, 17, 18, 19:
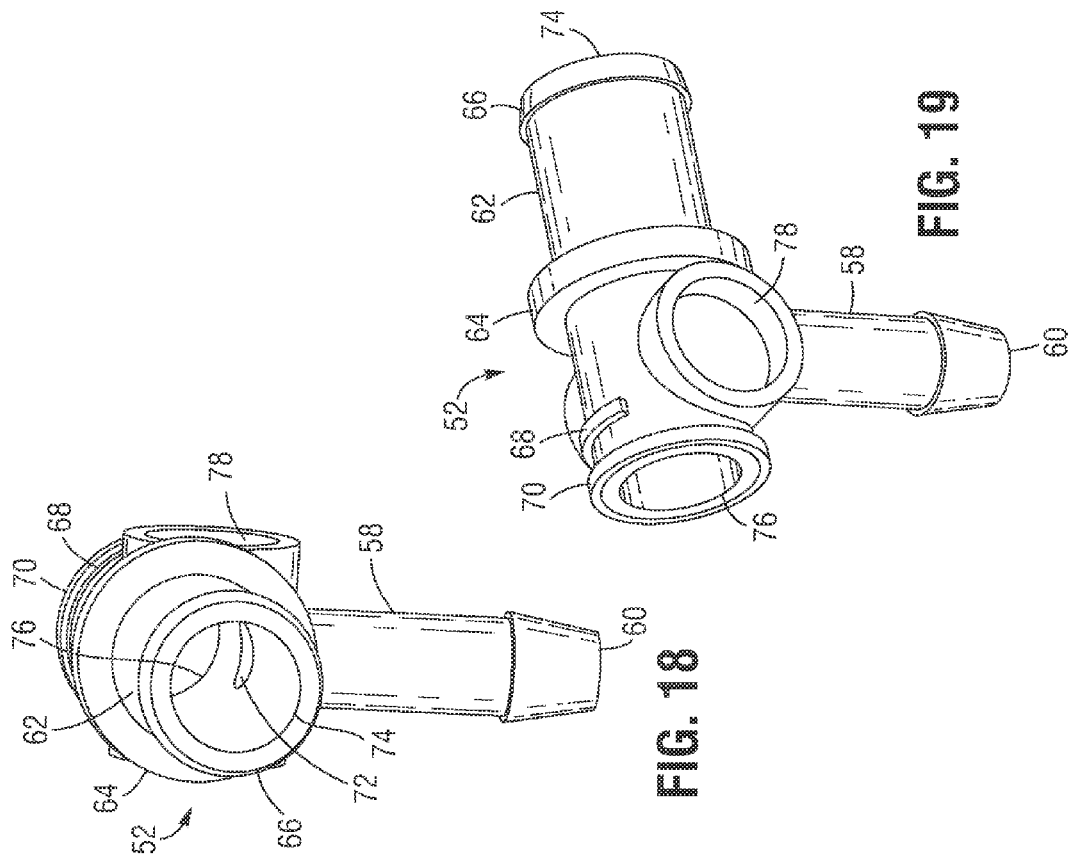
FIG. 16 is a top view of the housing of the valve of FIGS. 7-15.
FIG. 17 is a side view of the housing of FIG. 16.
FIG. 18 is a perspective view of the housing of FIG. 16 from an outlet end of the housing.
FIG. 19 is another perspective view of the housing of FIG. 16.
Figure 28:
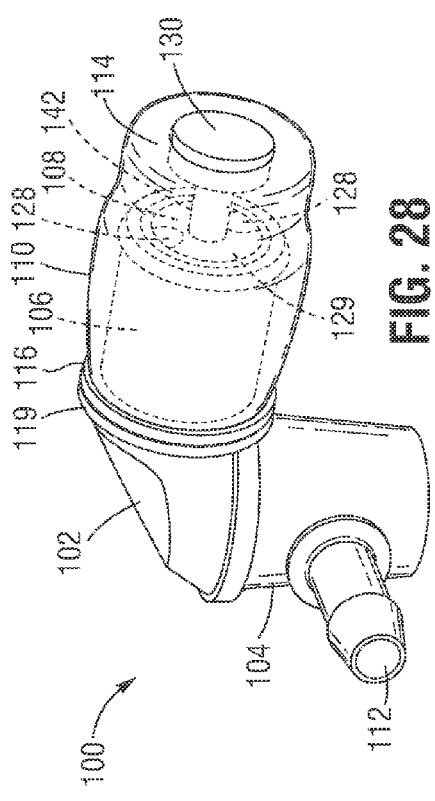
FIG. 28 is a perspective view of the valve of FIG. 24 in an open position with the bite valve engaged for selective drinking.
Figure 29:
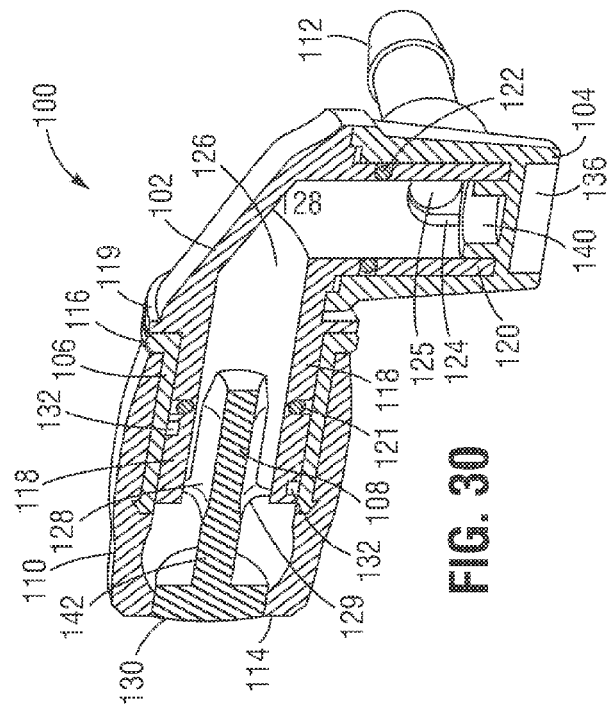
FIGS. 29 and 30 are cross-sectional view of the valve in the configuration of FIG. 28.

FIGS. 7-15 show another exemplary multi-position valve 50. FIGS. 7-9 show the valve 50 in an off or closed position, FIGS. 10-12 show the valve 50 in an on or open position, and FIGS. 13-15 show the valve 50 in a fully open or vented position. The valve 50 comprises a housing 52 (shown in FIGS. 16-19), a stem 54 (shown in FIGS. 20-23), and a sheath 56.

The housing 52 comprises an inlet conduit 58 within an inlet 60, and a tubular portion 62 within which the stem 54 is positioned. The tubular portion 62 is open at either axial end, with a front opening 74 and a rear opening 76. The inlet conduit 58 joins the tubular portion 62 of the housing at opening 72 (see FIG. 18) between the front opening 74 and the rear opening 76. The sheath 56 can be mounted over an annular ridge 66 at the forward end of the tubular portion 62 to retain the sheath on the housing with a rear end 98 of the sheath abutting an annular rim 64 of the housing. The housing 52 can further comprise an annular rear rim 70 and a semi-annular locking rib 68 slightly forward of the rear rim 70.

The stem 54 comprises a generally cylindrical body 80 that is positioned within the tubular body 62 of the housing, an arm 82 that extends around the rear end of the housing and engages with the locking rib 68 and the rear rim 70 of the housing, and a neck 92 and disk 94 portion at the front end of the stem that cooperate with the sheath 56 to form a bite valve. The body 80 of the stem 54 includes at least one conduit 88 that extends axially from adjacent to the opening 72 from the inlet conduit 58 forward to the front end of the stem body 80. In some embodiments, the stem body 80 comprise two or more of such conduits 88. The illustrated embodiment includes two conduits 88 on opposite sides of the stem body 80. An aperture 86 passes through the body between the rear ends of the conduits 88.

When the stem is rotated to the on position as shown in FIGS. 10-12, the aperture 86 is generally aligned with the opening 72 of the inlet conduit 58 of the housing such that fluid can pass from the inlet conduit and flow through the aperture and flow forwardly down both of the conduits 88 and out of the front opening 74 of the housing. When the stem is rotated to the off position as shown in FIGS. 7-9, the aperture 86 is not fluidly coupled with the opening 72 and instead a sidewall of the stem body faces the opening 72 can blocks fluid flow through the valve. The stem body 80 can further include an O-ring gasket positioned in an annular groove 90 rearward of the aperture 86 that seals with the inner surfaces of the tubular portion 62 of the housing and prevents fluid from escaping out of the rear opening 76 of the housing.

In the on position, when fluid travels down the conduits 88 and out the front opening 74 of the housing, the fluid enters an open area within the sheath 56 and is blocked from flowing out of the front outlet 96 of the sheath by an annular seal between the sheath and the disk 94 of the stem. The user can selectively open the seal by biting or pinching in the sheath around the neck 92 to allow fluid to flow out of the front outlet 96.

The stem 54 can also be moved axially within the housing 52 to adjust the valve 50 between the on position and the vented position of FIGS. 13-15. From the on position, the stem 54 is moved rearwardly relative to the housing 52 to reach the vented position. In vented position, the disk 94 is positioned rearwardly of the front outlet 96 of the sheath 54 in an interior region of the sheath having a greater inner diameter that the front outlet 96 such that fluid can freely flow around the disk 94 within the sheath and then flow out of the front outlet. This allows for a free flow of fluid through the valve in the vented position. In the vented position, the aperture 86 can be slightly rearward of the opening 72 of the inlet conduit, such as partially overlapping opening 72 or such that the lower conduit 88 is above the opening 72. Fluid from the inlet conduit 58 can enter the lower conduit 88 and flow both forwardly down that conduit and flow rearwardly to the aperture 86, through the aperture, and to the other conduit 88, allowing for minimal fluid resistance within the stem and housing.

The arm 82 of the stem includes a rearward facing surface 84 (FIG. 23) that is configured to engage with the rear rim 70 of the housing to block the stem from moving rearwardly beyond the vented position. The arm 82 can also contact the rear of the housing to block the stem from moving forwardly beyond the on and off positions. In the off position, the surface 84 of the arm can be engaged on the locking rib 68 of the housing to prevent the stem from moving rearward from the off position. Instead, the locking rib 68 requires that the stem be rotated from the off position to the on position first before the stem can be moved rearward from the on position to the vented position. The locking rib 68 is only semi-annular such that the arm rotates off of the locking rib moving from the off position to the on position, freeing the stem to move rearwardly relative to the housing. In some embodiments, in the vented position, a side surface of the arm can abut an end of the locking rib 68 to prevent the stem from rotating toward the off position while in the vented position, while in other embodiments the stem is allowed to rotated from the vented position to an alternative off position without passing through the on position.

In an alternative embodiment similar to the valve 50, the valve can be configured such that the stem is moved forward relative to the housing to move to the vented positions, with the disk 94 moving forwardly out of the sheath (like with the valve 2) instead of retracting into the sheath.

FIGS. 24-34 show another embodiment of a multi-position valve 100. FIG. 23A is a photograph of an example of the valve 100. The valve 100 comprises upper housing 102 pivotably mounted to a lower housing 104 to form an inlet valve, a sleeve 106 position around the forward end of the upper housing, a stem 108 mounted in and extending from the forward end of the upper housing, and a sheath 110 mounted on the sleeve 106 and engaged with the stem 108 to form a bite valve. Pivoting the upper housing 102 relative to the lower housing 104 opens and closes the inlet valve, while twisting the sheath 110 and sleeve 106 relative to the upper housing 102 causes the sheath and sleeve to move axially relative to the upper housing and stem in order to engage and dis-engage the bite valve. The stem 108 is stationary relative to the upper housing 102, and the sheath 110 is stationary relative to sleeve 106 except for elastic deformation of the sheath caused by biting or pinching. FIGS. 24-27 show the inlet valve in a closed position while FIGS. 28-34 show the inlet valve in an open position. FIGS. 24-25 and 28-30 show the bite valve in the engaged position while FIGS. 26-27 and 31-34 show the bite valve in the dis-engaged position. The various positions of the inlet valve and the various positions of the bite valve provide for at least four different combinations of configurations for the valve 100.

Figure 30:
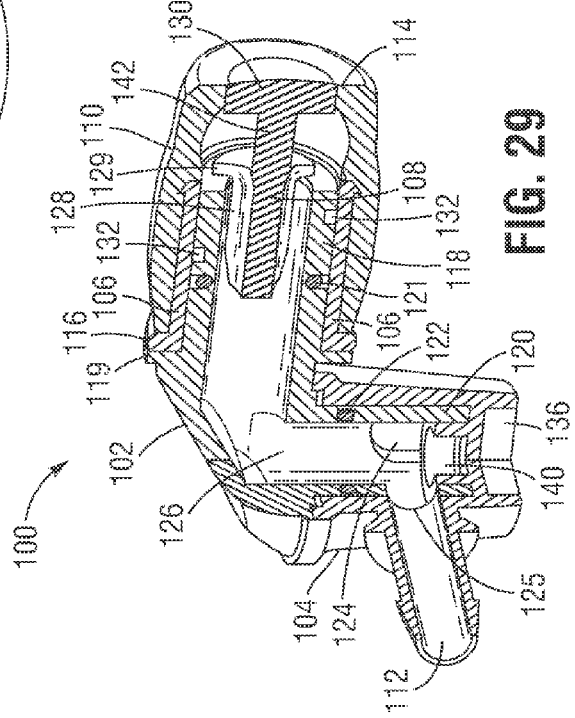

The lower housing 104 includes an inlet conduit 112 with a downstream outlet 125 (see FIGS. 30 and 34). In the closed position, the outlet 125 is blocked by a sidewall 120 of the upper housing 102 (see FIGS. 25 and 27), preventing fluid from entering the inner region 126 of the housing. In the open position, the outlet 125 is aligned with an opening 124 in the sidewall 120 (see FIGS. 30 and 34), allowing fluid flow into the inner region 126 of the housing. The sidewall 120 can comprise two or more of the openings 124 to allow for two or more open positions. The sidewall 120 of the upper housing 102 can be generally cylindrical and extends downwardly into the lower housing 104 within a complimentary outer wall of the lower housing. The cylindrical interface between the sidewall 120 and the lower housing 104 allows for pivoting motion while an O-ring gasket 122 positioned above the openings 124 prevents leakage. The lower housing 104 can further comprise an inner wall 140 that projects upward from the bottom of the lower housing and is positioned within the lower end of the of the sidewall 120. The upper portion of the lower housing 104 can engage with the upper housing 102 in a manner that secures the upper and lower housing together while still allowing for sufficient pivoting motion between the open and closed positions.

The sleeve 106 is mounted adjustably around the forward end 118 of the upper housing 102 and can include an inwardly projecting protrusion that rides in a helical groove 132 in the forward end 118 of the upper housing. The engagement of the protrusion in the helical groove 132 causes the sleeve 106 and sheath 110 to move axially as they are twisted relative to the upper housing 102. Twisting the sleeve and sheath in one direction causes them to move rearwardly toward the position shown in FIGS. 28-30 where the bite valve is engaged, while twisting the opposite direction causes the sleeve and sheath to move forwardly toward the position shown in FIGS. 31-34 where the bite valve is disengaged. Rotational and axial motion of the sleeve 106 can be limited in each direction by the length of the helical groove 132, such that motion ends when the protrusion of the sleeve contacts a wall at the end of the groove 132. Motion of the sleeve can also be limited in other ways, such as by contact of the rear rim 116 of the sleeve with the rim 119 of the upper housing, or other mechanical interferences between the sleeve and the upper housing. An O-ring gasket 121 can be mounted around the forward portion of the upper housing to seal with the sleeve rearward of the helical groove 132 to prevent leakage.

In other embodiments (not shown), the twist-to-move mechanism of the bite valve can be replaced with a simple pull-to-move mechanism where the sleeve and sheath are moved axially simply by pulling and pushing them axially, without twisting.

The stem 108 is inserted partially within the inner region 126 of the upper housing for retention and includes axially extending recesses 128 that are conduits for fluid to pass through as the fluid exits the upper housing. The stem 108 further includes a stop 129 that abuts the distal end of the upper housing, the neck 142, and the disk 130. When the bite valve is in the engaged position (FIGS. 28-30), the disk 130 seals with the outlet 114 of the sheath, and when the bite valve is in the disengaged position (FIGS. 31-34), the disk 130 is positioned rearwardly of the outlet 114 of the sheath within a portion of the sheath having a greater inner diameter than the outlet such that fluid can freely through the recesses 128, around the disk 130, and out the outlet 114. In the vented configuration of FIGS. 31-34, the inlet valve is also in the open position, such that fluid can flow freely through the whole valve 100. FIG. 23A shows an example of the valve 100 in this vented position.

FIGS. 35-41 show exemplary dimensions, in millimeters, of one embodiment of the valve 100 in various configurations.

Figure 42:
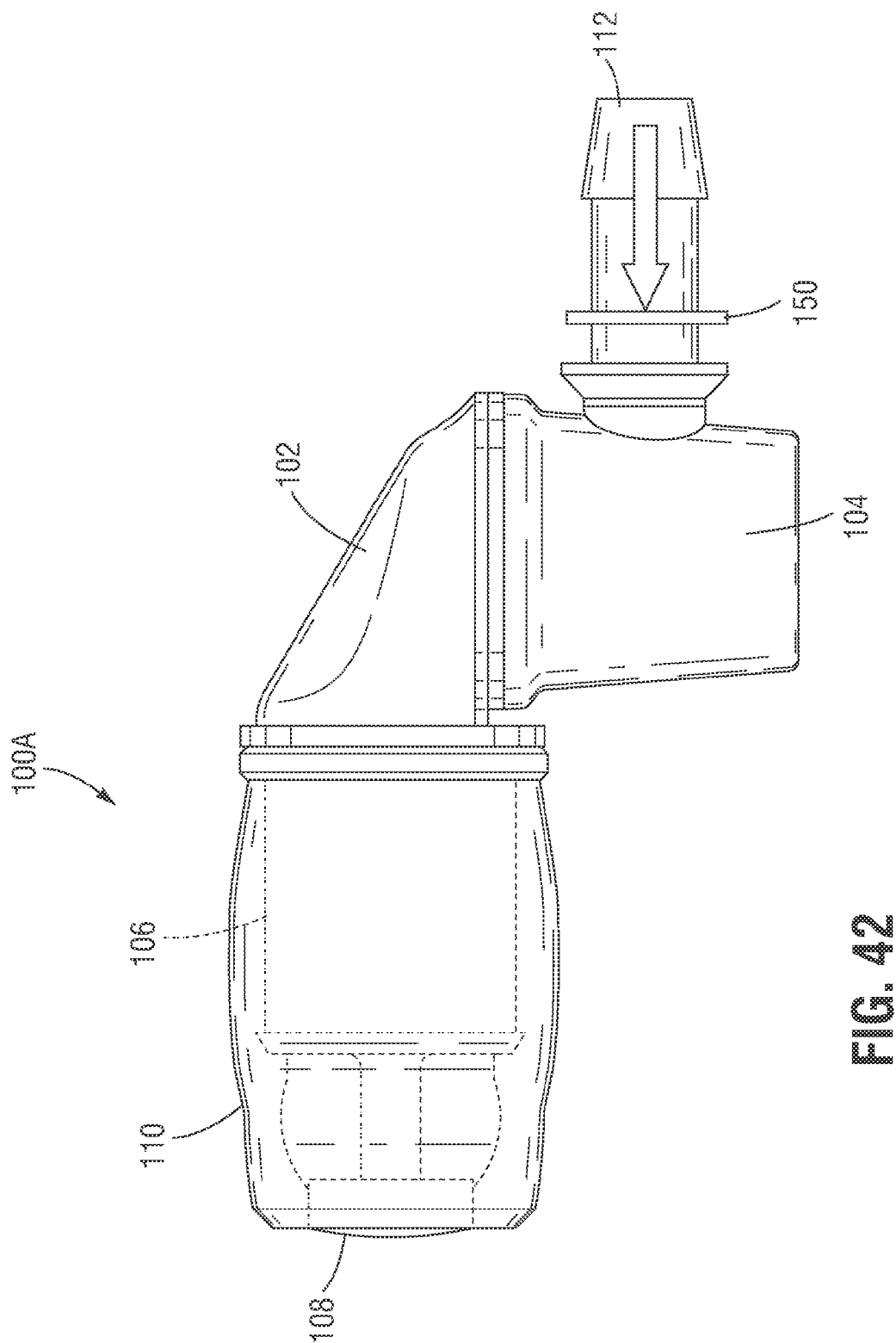
FIG. 42 is another embodiment similar to the valve of FIG. 24, including an additional check-valve at the inlet.

FIG. 42 shows an alternative embodiment of a multi-position valve 100A that is similar to the valve 100 but further includes a one-way valve, or check valve, 150 located within the inlet conduit 112. The one-way valve 150 prevents fluid from flowing from the upper housing 102 back out through the inlet conduit 112, but allows fluid flow through the inlet conduit into the upper housing 102. A check valve can alternatively be located in other portions of the housing.

FIGS. 43-46 show another embodiment of a multi-position valve 200 that is similar in most respects to the valve 100. The valve 200 comprises upper housing 202 pivotably mounted to a lower housing 204 to form an inlet valve, a sleeve 206 position around the forward end 218 of the upper housing, a stem 208 mounted in and extending from the forward end of the upper housing, and a sheath 210 mounted on the sleeve 206 and engaged with the stem 208 to form a bite valve. Pivoting the upper housing 202 relative to the lower housing 204 opens and closes the inlet valve, while twisting the sheath 210 and sleeve 206 relative to the upper housing 202 causes the sheath and sleeve to move axially relative to the upper housing and stem in order to engage and disengage the bite valve. The stem 208 is stationary relative to the upper housing 202, and the sheath 210 is stationary relative to sleeve 206 except for elastic deformation of the sheath caused by biting or pinching. The various positions of the inlet valve and the various positions of the bite valve provide for at least four different combinations of configurations for the valve 200.

The lower housing 204 includes an inlet conduit 212 with a downstream outlet 225. In the closed position, the outlet 225 is blocked by a sidewall 220 of the upper housing 202, preventing fluid from entering the inner region 226 of the upper housing. In the open position, the outlet 225 is aligned with one of two openings 224 in the sidewall 220, allowing fluid flow into the inner region 226 of the upper housing. The sidewall 220 of the upper housing 202 can be generally cylindrical and extends downwardly into the lower housing 204 within a complimentary outer wall of the lower housing. The cylindrical interface between the sidewall 220 and the lower housing 204 allows for pivoting motion while an O-ring gasket 222 positioned above the openings 224 prevents leakage. The lower housing 204 can further comprise an inner wall 240 that projects upward from the bottom of the lower housing and is positioned within the lower end of the of the sidewall 220.

Figure 43:
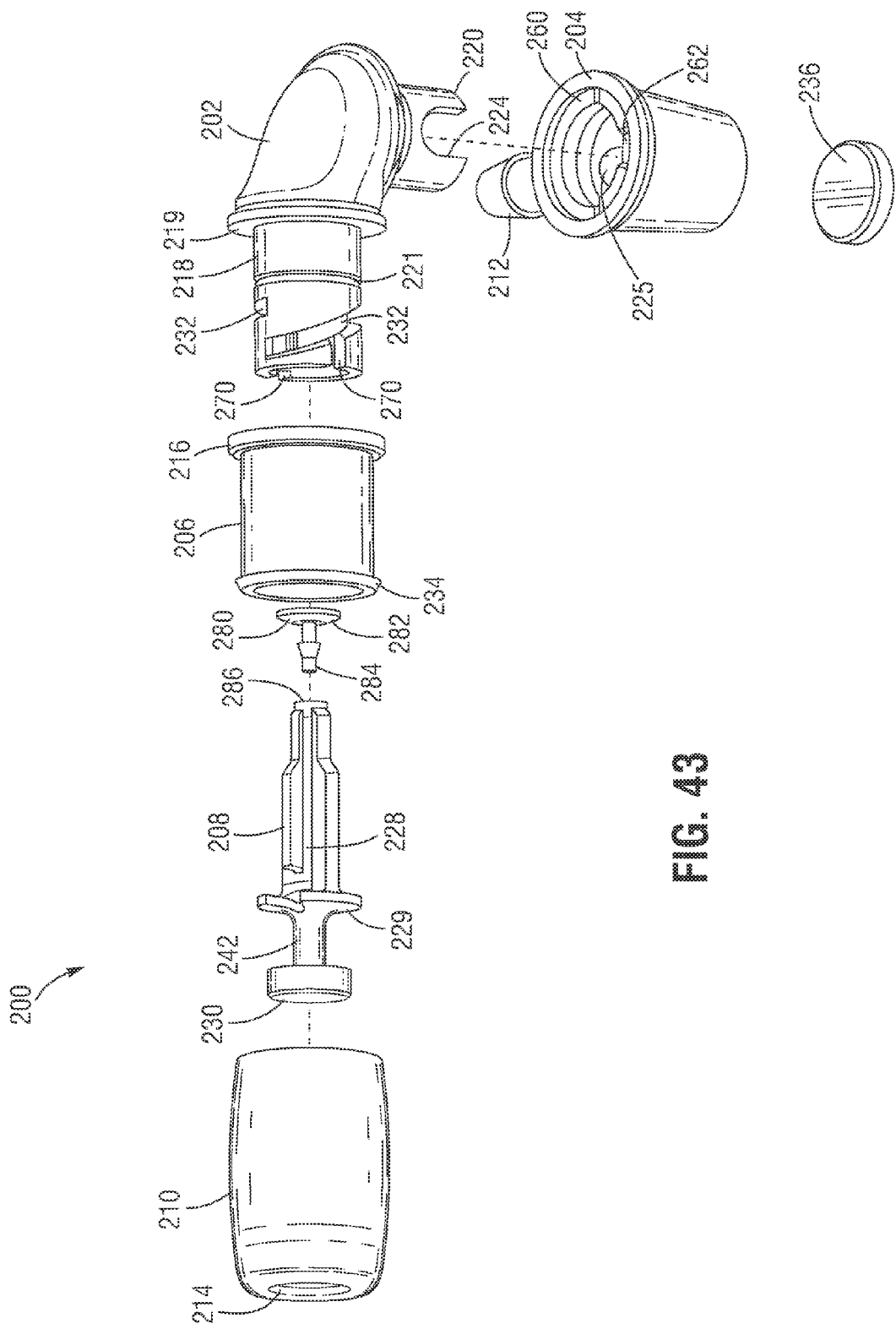
FIGS. 43-45 are perspective exploded views of yet another multi-position valve embodiment.
Figure 44:
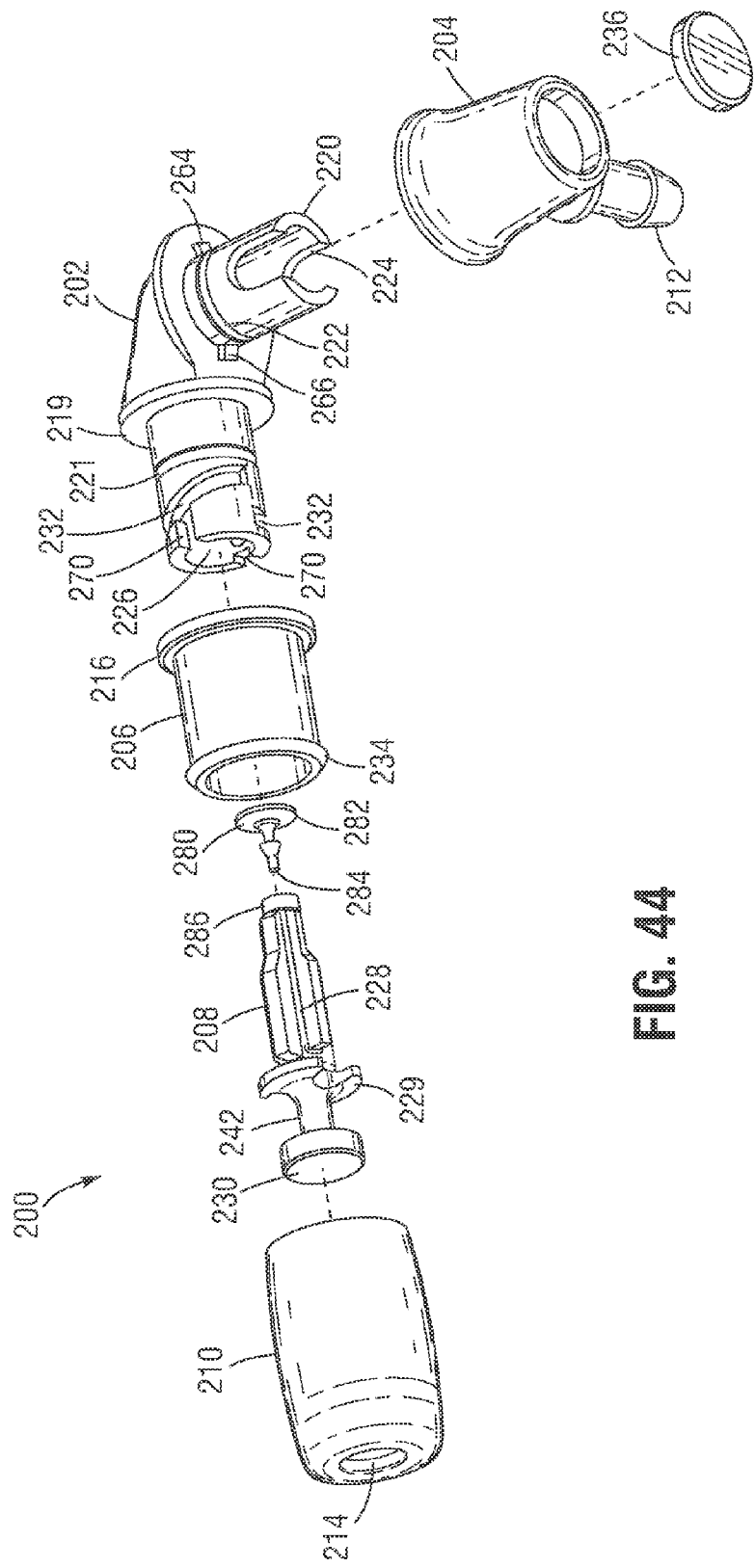
Figure 45:
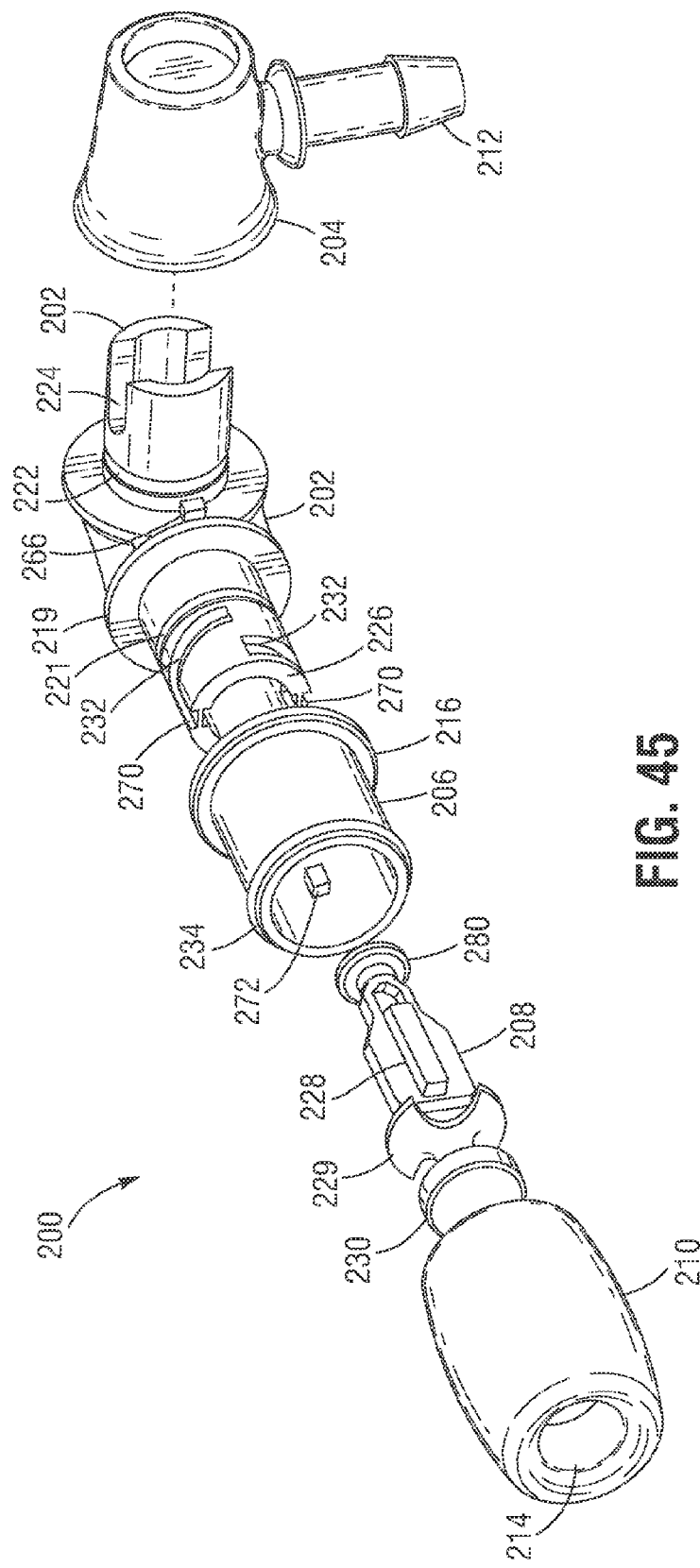
Figure 46:
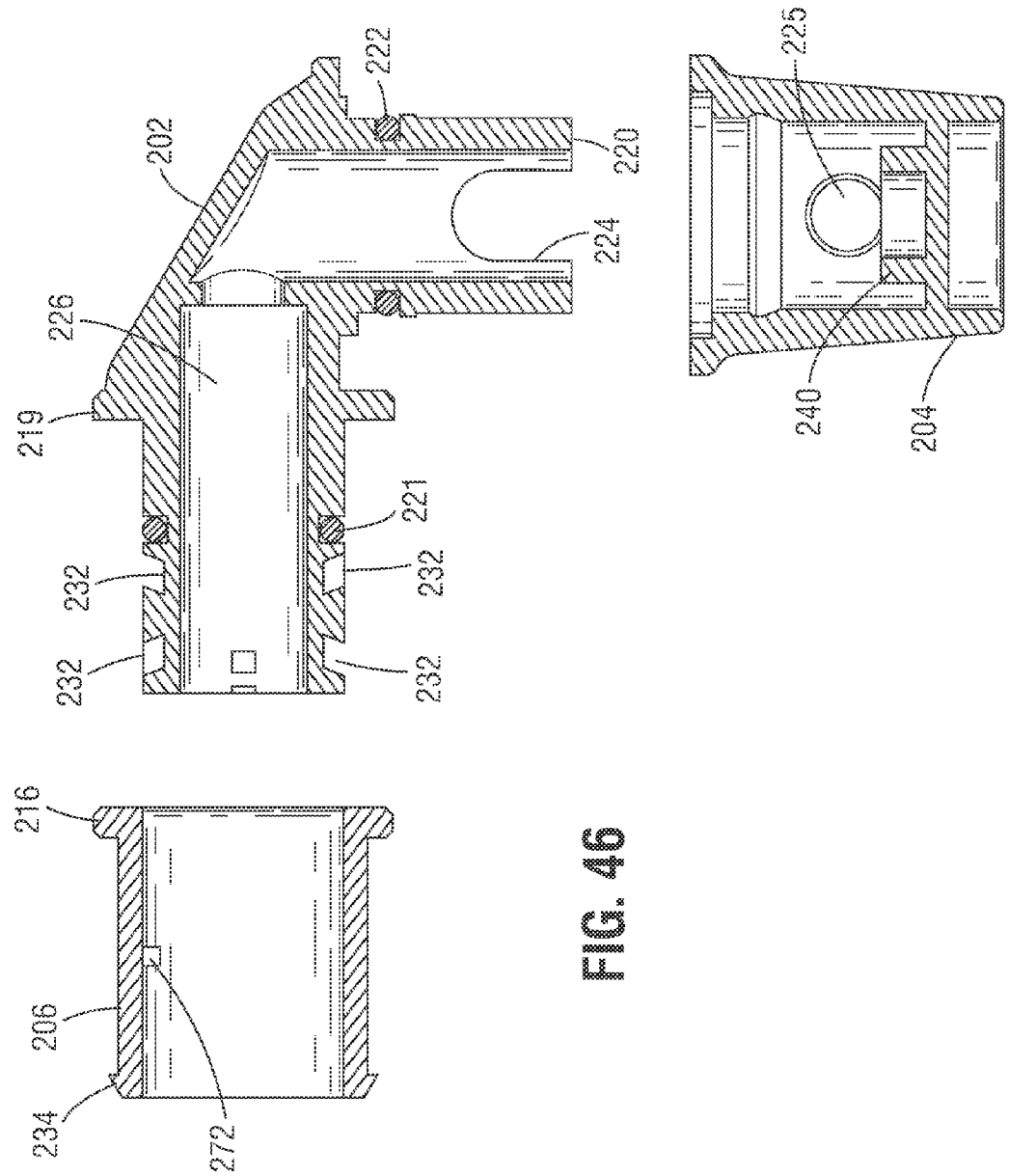
FIG. 46 is an exploded, cross-sectional, side view of a portion of the valve of FIGS. 43-45.

The upper portion of the lower housing 204 can include grooves, threads, or other features, such as features 260 and 262 shown in FIG. 43, that engage with corresponding features on the upper housing 202, such as features 264 and 266 shown in FIG. 44, in a manner that secures the upper and lower housing together while still allowing for sufficient pivoting motion between the open and closed positions.

The sleeve 206 is mounted adjustably around the forward end 218 of the upper housing 202 and includes one or more inwardly projecting protrusions 272 (one shown, see FIGS. 45 and 46) that ride in one or more helical grooves 232 (two shown) in the forward end 218 of the upper housing. The engagement of the protrusions 272 in the helical grooves 232 causes the sleeve 206 and sheath 210 to move axially as they are twisted relative to the upper housing 202. Twisting the sleeve and sheath in one direction causes them to move rearwardly toward a position where the bite valve is engaged, while twisting the opposite direction causes the sleeve and sheath to move forwardly toward a position where the bite valve is disengaged. Rotational and axial motion of the sleeve 206 can be limited in each direction by the length of the helical grooves 232, such that motion ends when the protrusions of the sleeve contact walls at the end of the grooves 232. Motion of the sleeve can also be limited in other ways, such as by contact of the rear rim 216 of the sleeve with the rim 219 of the upper housing, or other mechanical interferences between the sleeve and the upper housing. An O-ring gasket 221 can be mounted around the forward portion of the upper housing to seal with the sleeve rearward of the helical groove 232 to prevent leakage.

The forward portion of the upper housing can also include one or more axially extending grooves 270 (two shown) that extend from an intermediate portion of a respective one of the helical grooves 232 to the front end of the upper housing. The axial grooves 270 can allow the sleeve 206 to be mounted onto and dismounted from the upper housing 202 by providing a path the inner protrusions 272 to enter into and exit from the helical grooves 232.

The stem 208 is inserted partially within the inner region 226 of the upper housing for retention, such as via a friction fit, and includes axially extending recesses 228 that are conduits for fluid to pass through as the fluid exits the upper housing. The stem 208 further includes a stop 229 that abuts the distal end of the upper housing, the neck 242, and the disk 230. When the bite valve is in the engaged position, the disk 230 seals with the outlet 214 of the sheath, and when the bite valve is in the disengaged position, the disk 230 is positioned rearwardly of the outlet 214 of the sheath within a portion of the sheath having a greater inner diameter than the outlet such that fluid can freely through the recesses 228, around the disk 230, and out the outlet 214. In the vented configuration where the inlet valve is also in the open position, fluid can flow freely through the whole valve 200.

The valve 200 further includes a one-way valve, or check valve, 280 located within the upper housing 202 and mounted on the rear of the stem 208. The one-way valve 280 comprises a flexible disc-shaped flap 282 and a forwardly projecting finger 284 that mounts to a corresponding feature 286 at the rear of the stem 208. The flap 282 is configured to seal against the walls of the inner region 226 of the upper housing 202 when back-flow pressure occurs in order to prevent fluid from within the sheath 210 from flowing past the stem back into the housing, but the flap elastically deforms under forward flow pressure to allow fluid flow through from the upper housing 102 into the sheath 110. An additional valve seat (not shown) that compliments the one-way valve 280 can be mounted within the upper housing in some embodiments, such that the flap 282 seals against the valve seat to block back flow.

In some embodiments, the valves disclosed herein can comprise magnets or magnetic metal on one or more surfaces of the housing for releasably attaching the valve to a complementary magnetic surface. See, for example, magnetic feature seats 78 of the valve 50 (FIG. 8), magnetic feature 136 of the valve 100 (FIG. 29), and magnetic feature 236 of the valve 200 (FIG. 44). The complementary magnetic surface may be located on an item worn by a user, such as shoulder strap of a fluid reservoir, such that the valve can attached to the magnetic surface and stored at a convenient location when not in use. The complementary magnetic surface can also be located on a bicycle or other exercise equipment, such as in the vicinity of a handlebar of a bicycle. In such uses, the valve typically is connected to a fluid container by a flexible conduit, one end of which is coupled to the inlet conduit of the valve. Instead of magnetic materials, the disclosed valves can also comprise a variety of other non-magnetic attachment means as known to those skilled in the art, such as hook-and-loop fasteners or mechanical fasteners, to releasably attach the valve to another surface when not in use.

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Integers, characteristics, materials, and other features described in conjunction with a particular aspect, embodiment, or example of the disclosed technology are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods.

As used herein, the terms "a", "an", and "at least one" encompass one or more of the specified element. That is, if two of a particular element are present, one of these elements is also present and thus "an" element is present. The terms "a plurality of" and "plural" mean two or more of the specified element. As used herein, the term "and/or" used between the last two of a list of elements means any one or more of the listed elements. For example, the phrase "A, B, and/or C" means "A", "B,", "C", "A and B", "A and C", "B and C", or "A, B, and C." As used herein, the term "coupled" generally means physically coupled or linked and does not exclude the presence of intermediate elements between the coupled items absent specific contrary language.

In view of the many possible embodiments to which the principles of the disclosed technology may be applied, it should be recognized that the illustrated embodiments are only examples and should not be taken as limiting the scope of the disclosure. Rather, the scope of the disclosure is at least as broad as the following claims. I therefore claim all that comes within the scope of these claims.

The invention claimed is:

1. A multi-position valve for drinking fluid from a portable fluid container, wherein the multi-position valve allows for manual actuation of components of the multi-position valve between three or more positions, including a closed position where no fluid flow is permitted through the multi-position valve, a selectively open position where a user can obtain fluid through the multi-position valve by selectively actuating a bite valve of the multi-position valve to open a fluid flow pathway through the multi-position valve, and a fully open position where the bite valve is disengaged to permit free flow of fluid through the multi-position valve;
wherein the multi-position valve comprises:
a main housing component; and
an inlet housing component rotatably coupled to the main housing component, the inlet housing component including a fluid inlet for the multi-position valve;
wherein the inlet housing component can be positioned at a first rotational position relative to the main housing component to allow fluid flow from the fluid inlet through the multi-position valve, and the inlet housing component can be positioned to a second rotational position relative to the main housing component to block fluid flow through the multi-position valve;
wherein the bite valve comprises:
a base coupled to an outlet end of a main housing component of the valve;
a sheath mounted around the base; and
a stem mounted in a fluid outlet of the main housing component;
wherein the stem and the sheath form a seal that blocks fluid flow through the bite valve when the bite valve is not actuated, and the sheath can be resiliently deformed to open the seal to allow fluid flow through the bite valve; and
wherein the base is mounted to the main housing component such that rotation of the base relative to the main housing component causes axial motion of the base and sheath relative to the main housing component and the stem, such that rotation of the base in one direction moves the sheath into a selective actuation position where the sheath seals against the stem, and rotation of the base in a second direction opposite the first direction moves the sheath into a vented or bypass position wherein the sheath remains spaced apart from the stem and allows free fluid flow through the bite valve.

2. The multi-position valve of claim 1, wherein the fluid inlet of the inlet housing component is configured to be coupled to a flexible hose that is coupled to a portable fluid container, such that fluid can flow from the fluid container, through the flexible hose, and through the multi-position valve for drinking by a user.

3. The multi-position valve of claim 1, wherein the main housing component has a right-angled configuration with its fluid inlet oriented perpendicular to its fluid outlet.

4. The multi-position valve of claim 1, wherein the multi-position valve has a fluid inlet and a fluid outlet that define flow paths that are parallel to each other and offset from each other.

5. The multi-position valve of claim 1, wherein the base is rotatable about a first axis relative to the main housing component, the inlet housing component is rotatable about a second axis relative to the main housing component, and the first axis is not parallel to the second axis.

6. The multi-position valve of claim 1, wherein the base moves along a helical path relative to the main housing component.

7. The multi-position valve of claim 1, wherein the multi-position valve defines a fluid flow pathway extending between a fluid inlet coupleable to a flexible tube and a fluid outlet configured to drink fluid from, wherein the multi-position valve comprises an adjustable upstream valve portion adjacent the fluid inlet and an adjustable bite valve portion adjacent the fluid outlet; and wherein the multi-position valve is adjustable between three or more positions, including:
- the closed position, wherein the upstream valve portion is closed and no fluid flow is permitted through the fluid flow pathway;
- the selectively open position, wherein the upstream valve portion is open, the bite valve portion is in an engaged position, and a user can obtain fluid through the multi-position valve by pinching a flexible sheath of the bite valve portion to open the fluid flow pathway through the bite valve portion; and
- the fully open position, wherein the upstream valve portion is open and the bite valve portion is in a disengaged position, such that fluid can freely flow through the entire fluid flow pathway without pinching the flexible sheath.

8. The multi-position valve of claim 7, wherein the multi-position valve further comprises:
- a rigid main housing component that supports the flexible sheath of the bite valve portion; and
- a rigid inlet housing component rotatably coupled to the main housing component, the inlet housing component including the fluid inlet;
- wherein the inlet housing component can be positioned at a first rotational position relative to the main housing component to open the upstream valve portion and allow fluid flow from the fluid inlet into the main housing component, and the inlet housing component can be positioned to a second rotational position relative to the main housing component to close the upstream valve portion and block fluid flow from the fluid inlet into the main housing component.

9. A personal hydration system comprising a multi-position valve a flexible hose fluidly coupled to the multi-position valve, and a fluid reservoir fluidly coupled to the flexible hose and configured to be worn by a user such that the user can drink fluid from the fluid reservoir via the flexible hose and the multi-position valve while the user is engaged in athletic activity;
- wherein the multi-position valve allows for manual actuation of components of the multi-position valve between three or more positions, including a closed position where no fluid is permitted through from the flexible hose through the multi-position valve, a selectively open position where a user can obtain fluid from the fluid reservoir through the flexible hose and through the multi-position valve by selectively actuating a bite valve of the multi-position valve to open a fluid flow pathway through the multi-position valve, and a fully open position where the bite valve is disengaged to permit free flow of fluid from the fluid reservoir through the flexible hose and the multi-position valve;

wherein the multi-position valve comprises:
- a main housing component; and
- an inlet housing component rotatably coupled to the main housing component, the inlet housing component including a fluid inlet for the multi-position valve;
- wherein the inlet housing component can be positioned at a first rotational position relative to the main housing component to allow fluid flow from the fluid inlet through the multi-position valve, and the inlet housing component can be positioned to a second rotational position relative to the main housing component to block fluid flow through the multi-position valve;

wherein the bite valve comprises:
- a base coupled to an outlet end of a main housing component of the valve;
- a sheath mounted around the base; and
- a stem mounted in a fluid outlet of the main housing component;
- wherein the stem and the sheath form a seal that blocks fluid flow through the bite valve when the bite valve is not actuated, and the sheath can be resiliently deformed to open the seal to allow fluid flow through the bite valve; and
- wherein the base is mounted to the main housing component such that rotation of the base relative to the main housing component causes axial motion of the base and sheath relative to the main housing component and the stem, such that rotation of the base in one direction moves the sheath into a selective actuation position where the sheath seals against the stem, and rotation of the base in a second direction opposite the first direction moves the sheath into a vented or bypass position wherein the sheath remains spaced apart from the stem and allows free fluid flow through the bite valve.

10. A multi-position valve for drinking fluid from a portable fluid container, wherein the multi-position valve allows for manual actuation of components of the multi-position valve between three or more positions, including a closed position where no fluid flow is permitted through the multi-position valve, a selectively open position where a user can obtain fluid through the multi-position valve by selectively actuating a bite valve of the multi-position valve to open a fluid flow pathway through the multi-position valve, and a fully open position where the bite valve is disengaged to permit free flow of fluid through the multi-position valve;
- wherein the multi-position valve comprises:
  - a housing comprising a fluid inlet and a fluid outlet oriented perpendicular to each other, a fluid passageway extending between the fluid inlet and the fluid outlet, and a rear opening in communication with the fluid passageway;
  - a stem that extends through the rear opening of the housing, through a portion of the fluid passageway, and through the fluid outlet of the housing; and
  - a resiliently flexible sheath mounted around the fluid outlet of the housing and around a sealing head of the stem;
- wherein the stem is rotatable about a stem rotation axis relative to the housing to adjust the multi-position valve between a closed position where fluid flow through the fluid passageway is blocked and an open position where fluid flow through the fluid passageway is permitted; and wherein, when the stem is rotated to the open position, the stem is slidable along the stem rotation axis relative to the housing and the sheath to adjust the multi-position valve between a selectively open position, where the stem head seals against the sheath and a user can pinch the sheath to break the seal and allow fluid flow through the multi-position valve, and a fully open position where the sheath does not seal against the stem head and fluid flow is allowed through the multi-position valve without pinching the sheath.

11. The multi-position valve of claim 10, wherein the stem head is retracted axially into the sheath to adjust the multi-position valve to the fully open position.

12. The multi-position valve of claim 10, wherein the stem head is advanced axially out of the sheath to adjust the multi-position valve to the fully open position.

13. The multi-position valve of claim 10, wherein the stem includes an arm that engages with an outside of the housing to limit axial motion of the stem relative to the housing.

14. A personal hydration system comprising the multi-position valve of claim 10, a flexible hose fluidly coupled to the multi-position valve, and a fluid reservoir fluidly coupled to the flexible hose and configured to be worn by a user such that the user can drink fluid from the fluid reservoir via the flexible hose and the multi-position valve while the user is engaged in athletic activity.

\* \* \* \* \*